(No Model.)

H. C. JONES.
FRUIT SIZER.

No. 529,032. Patented Nov. 13, 1894.

Witnesses,
S. C. Muller
A. W. Stillman

Inventor,
H. C. Jones

UNITED STATES PATENT OFFICE.

HENRY C. JONES, OF ORANGE CITY, FLORIDA.

FRUIT-SIZER.

SPECIFICATION forming part of Letters Patent No. 529,032, dated November 13, 1894.

Application filed June 28, 1894. Serial No. 515,914. (No model.)

*To all whom it may concern:*

Be it known that I, HENRY C. JONES, a citizen of the United States, residing at Orange City, in the county of Volusia and State of Florida, have invented a new and useful Machine for Assorting Fruit According to its Size, of which the following is a specification, reference being had to the accompanying drawings, in which—

Figure 1:
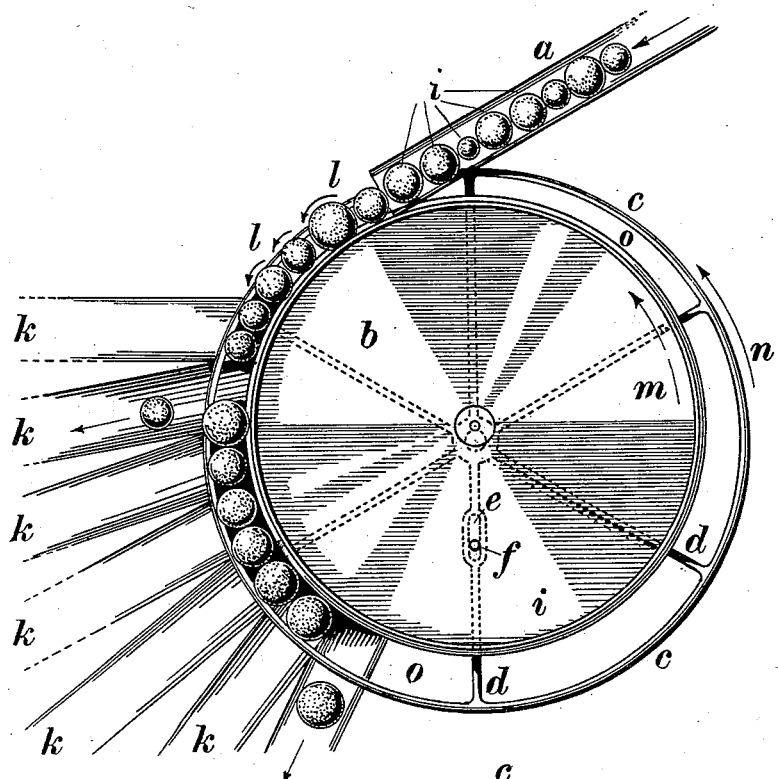
Figure 2:
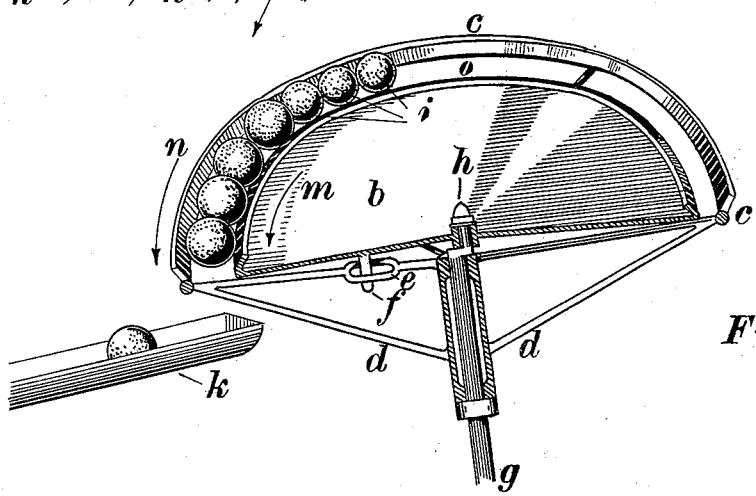

Figure 1 is a plan view, and Fig. 2 a perspective view partly in section.

Certain fruits as oranges are packed for shipment in boxes or crates of uniform size, and it is necessary before beginning to pack to know how many oranges there will be to a box so as to arrange the tiers and layers accordingly.

My invention comprises a wheel $c$ supported by spokes $d$ and free to revolve around a stationary shaft $g$. The axis of this wheel is inclined to a slight angle to the perpendicular as shown in Fig. 2. Just above this wheel and at the same angle is a smaller wheel $b$, also free to revolve, not about $g$ as a center but about $h$, Fig. 2. One spoke of the large wheel is made into a loop at $e$, and a pin $f$ of the small wheel engages therein, so that as either wheel revolves the other follows, as at $m$, $n$, Fig. 1, and the two wheels being eccentric this relation will exist as they both revolve. One wheel being smaller than the other a margin will be left at $o$—$o$, and the wheels not being concentric this margin will be crescent shaped, being just smaller than the smallest orange at the top and just wider than the widest at the bottom.

Now it will be readily seen that if oranges, $i$, are placed in the narrow space at the top, their weight will cause the wheels to revolve by reason of the angle of inclination, and as they revolve the opening $o$ gradually widens, allowing the fruit to drop through wherever the opening is of suitable width. The oranges may be fed on through a spout as at $a$ and drop through into other spouts $k$, leading off as desired. Now the two wheels $b$ and $c$ being of different diameters have a different circumferential speed, the outer being the greater, so that an orange in the slot would not only revolve with the wheels but would also revolve around its own center as an axis as at $l$, $l$, so that if it went from the spout $a$ with its greatest diameter across the opening $o$, it would be so revolved as to fall through in its proper place. Otherwise it might be given a false rating.

I am aware that rotary fruit assorters have been constructed but requiring motive power for their operation, and I am also aware that assorters have been made depending on the varying width of a tapering slot but in such cases the sides were straight and of considerable length instead of being circular and consequently more compact. So far as I know no attempt has ever been made to correct the natural tendency of an oval orange to fall with its greatest diameter across such a slot.

My invention has been reduced to practice and I desire to secure Letters Patent upon the following:

A fruit assorter consisting of a revoluble skeleton wheel inclosing a second and smaller wheel having its axis parallel to the first but eccentric thereto, so arranged as to provide an open marginal crescent shaped fruit passage between the rims of the wheels, the axis of each wheel inclined to such an angle that the weight of the fruit delivered on the upper edge will cause the wheels to revolve, either wheel communicating the motion to the other by a pin in one engaging in a slot in the other, the whole in connection with suitable spouts for conveying the fruit to and away from the wheels, all being substantially as described and for the purposes set forth.

H. C. JONES.

Witnesses:
S. C. FULLER,
A. M. STILLMAN.